2,970,988

NEW FLUORINE-CONTAINING POLYMERS AND PREPARATION THEREOF

Elizabeth S. Lo, Elizabeth, N.J., assignor, by mesne assignments, to Minnesota Mining and Manufacturing Company, St. Paul, Minn., a corporation of Delaware No Drawing. Filed Oct. 14, 1955, Ser. No. 540,607

5 Claims. (Cl. 260—87.7)

This invention relates to new and useful halogen-containing polymeric compositions having improved properties, and to a method for the preparation thereof. In one aspect this invention relates to new and valuable high molecular weight fluorine-containing resinous thermoplastics and elastomers having improved properties. In another aspect this invention relates to a process for the production of new and valuable high molecular weight fluorine-containing resinous thermoplastics and elastomers.

For a long time there has been a search for polymeric materials, including both thermoplastic and elastomeric polymeric materials, possessing the combined characteristics of a relatively high degree of resistance to hydrocarbon fuels, chemical and thermal stability, and which can be fabricated readily into a wide variety of useful articles. It is known that highly fluorinated thermoplastic polymers (for example, polytetrafluoroethylene and polytrifluorochloroethylene), obtained by the homopolymerization of perfluorohalomonoolefins, have many useful applications by virtue of their chemical inertness, and high physical strength and resistance. At the same time, however, certain of their other physical properties, such as their insolubility in organic solvents at room temperature, requires that such polymers be used in the form of special dispersions when applying them, for example, as protective coatings, and that even then, a fusion technique is necessary in order to form a continuous coating or film of the polymer.

In addition to the desirability of having a fluorine-containing thermoplastic of improved properties, there also has been a demand for a synthetic high and low temperature elastomer having good physical and mechanical properties and which possesses a combination of chemical inertness to strong chemicals, inertness to aromatic and aliphatic type oils and fuels, and which is easily vulcanized and fabricated into a wide variety of articles.

It is an object of the present invention to provide new and valuable fluorine-containing polymeric materials having improved properties, and to provide a process for the preparation thereof.

Another object is to provide new thermoplastic materials suitable as coatings or films having desirable physical and chemical characteristics, exhibiting the properties of corrosion resistance to oils, fuels, and various powerful reagents, and at the same time, possessing relatively high hardness and flexibility over a wide range of temperatures and which are soluble in various relatively volatile organic solvents and other vehicles at room temperature.

Another object is to provide a synthetic high molecular weight elastomer which is easily vulcanized and which retains its flexibility when exposed to low temperatures and which is resistant to degradation at temperatures up to 600° F.

A further object is to provide a fluorine-containing elastomer which is readily applied as a protective coating to surfaces which are to be exposed to strong chemicals or corrosive fuels.

A further object is to provide a chemically stable polymeric composition which is useful as a high temperature elastomer.

A still further object is to provide high molecular weight fluorine-containing thermoplastics and elastomers having the above-mentioned desirable properties and which are readily fabricated into a wide variety of useful end products.

A still further object is to provide a process for the manufacture of fluorine-containing polymers having the above-mentioned desirable characteristics and properties.

Various other objects and advantages of the present invention will become apparent to those skilled in the art from the accompanying description and disclosure.

The above objects are accomplished by the process which comprises polymerizing 2,3,3,3-tetrafluoropropene in the presence of a polymerization promoter by homopolymerization, or by copolymerization with a halogen-substituted ethylenically unsaturated hydrocarbon comonomer having at least 2 halogen substituents on a terminal carbon atom. The polymerization is preferably effected in the presence of a free radical-forming promoter, and may be carried out in an aqueous or non-aqueous medium. The process of the present invention is carried out at a temperature between about −30° C. and about 150° C. under autogenous conditions of pressure or at superimposed pressures up to 500 atmospheres or higher. The polymers thus obtained are valuable macromolecules which are adaptable to a number of commercial uses based on the fact that their various properties range from those of rigid resinous thermoplastics to tough, hard, rubber-like materials possessing varying degrees of flexibility, elasticity, and extensibility, and which are easily vulcanized and processed.

The homopolymer of 2,3,3,3-tetrafluoropropene is a non-extensible resinous thermoplastic which has good resistance to oils and hydrocarbon-fuels, is selectively soluble in various organic solvents and is readily molded by conventional molding techniques. The fact that 2,3,3,3-tetrafluoropropene homopolymerizes to a thermoplastic polymer is unexpected inasmuch as other fluoropropenes such as hexafluoropropene, 2-chloro-3,3,3-trifluoropropene and 3,3,3-trifluoropropene do not polymerize to any appreciable degree under the conditions described herein.

When 2,3,3,3-tetrafluoropropene is copolymerized in accordance with the present invention a polymeric material is produced which is chemically and thermally stable, resistant to oil and hydrocarbon fuels and moldable by conventional techniques to yield a wide variety of useful articles. The copolymers are particularly suited and useful as durable, flexible protective coatings on surfaces which are to be subjected to environmental conditions in which they may come into contact with corrosive substances and relatively low as well as high temperatures.

The halogen-substituted ethylenically unsaturated hydrocarbon comonomers or olefins which are polymerized with 2,3,3,3-tetrafluoropropene by the process of the present invention are those having a terminal carbon atom bearing at least 2 halogen substituents and in which the only other substituents of the hydrocarbon also are atoms of halogen. Of these comonomers the acyclic monoolefins and diolefins having not more than 8 carbon atoms and having the halogen substituents selected from the group consisting of chlorine and fluorine are preferred. It has been found that the copolymerization of 2,3,3,3-tetrafluoropropene with the halogen-substituted ethylenes in which at least one of the halogen substituents is fluorine, and the conjugated dienes having a terminal carbon atom bearing two fluorine substituents, leads to the production of polymeric materials having exceptionally good high temperature properties.

The aforesaid halogen-substituted monoolefins included as comonomers of the present invention are the ethylenes, propenes, butenes, etc., in which 2 or more hydrogen atoms are substituted only with a corresponding number of halogen atoms and in which at least 2 of the halogen substituents are bonded to a terminal carbon atom, and include the polyhalogenated and perhalogenated monoolefins. Typical examples of this class of comonomer are vinylidene fluoride, 1,1-chlorofluoroethylene, trifluoroethylene, trifluorochloroethylene, trifluorobromoethylene, tetrafluoroethylene, dichlorodifluoroethylenes, 3,3,3-trifluoropropene, 2-chloro-3,3,3-trifluoropropene, hexafluoropropene, 2-chloropentafluoropropene, 3,3,3-trifluoroisobutene, 1,1,1-trifluoro-3-trifluoromethylbutene-2, hexafluoroisobutene and 4,4-dichlorohexafluorobutene-1.

Typical examples of the above-defined halogen-substituted diolefins which are employed in accordance with the present invention are 1,1-difluorobutadiene, 1,1-difluoro-2-methylbutadiene, 1,1-difluoro-3-methyl-butadiene, 1,1,2-trifluorobutadiene, 1,1,3-trifluorobutadiene, 1,1,3-trifluoro-2-methyl-butadiene and hexafluorobutadiene.

It is to be understood that any combination of the above mentioned comonomers may be reacted with 2,3,3,3-tetrafluoropropene by the process of the present invention to form useful terpolymers.

The copolymers of the present invention contain 2,3,3,3-tetrafluoropropene and the above-mentioned comonomers in varying comonomer ratios. The particular composition and physical nature of the copolymer products obtained in any one particular copolymerization reaction depends to a large extent upon the composition of the monomer mixture initially charged to the reaction zone and on the particular comonomer employed. Generally speaking, the mol ratio of combined monomers in the finished product may vary over relatively wide limits such as between about 1:99 and about 99:1 of 2,3,3,3-tetrafluoropropene: comonomer. In order to obtain halogen-containing polymers having considerably improved properties, i.e. improved high temperature stability and resistance to swell by aliphatic and aromatic oils and fuels, it is preferable to prepare copolymers having a mol ratio of combined 2,3,3,3-tetrafluoropropene to combined comonomer of between about 2:98 and about 90:10. When copolymerizing 2,3,3,3,-tetrafluoropropene with a comonomer which copolymerizes at about the same rate, the composition of the finished copolymer will usually be about the same as the composition of the initial monomer feed. When copolymerizing 2,3,3,3-tetrafluoropropene with a comonomer which does not homopolymerize readily such as hexafluorobutadiene, hexafluoropropene, 2-chloro-3,3,3-trifluoropropene, and unsymmetrical dichlorodifluoroethylene, a monomer charge containing less than about 50 mol percent of 2,3,3,3-tetrafluoropropene is employed in order to obtain copolymers having a composition within the above-mentioned preferred range. On the other hand, when copolymerizing 2,3,3,3-tetrafluoropropene with a comonomer which homopolymerizes readily or which copolymerizes at a faster rate than 2,3,3,3-tetrafluoropropene such as the above-mentioned polyfluorinated dienes, a monomer charge containing more than about 50 mol percent and up to about 99 mole percent of 2,3,3,3,-tetrafluoropropene is employed.

Particularly valuable chemically resistant high temperature elastomers which are also elastomers at room temperature, are the copolymers containing between about 15 and about 85 mol percent of 2,3,3,3-tetrafluoropropene, the remaining major constituent preferably being the fluorine substituted ethylenes such as tetrafluoroethylene, trifluoroethylene and vinylidene fluoride. Some of the copolymers of the present invention are resinous thermoplastic materials at room temperature but unexpectedly become elastomeric and rubbery when heated to temperatures above 50° C. An example of this type of copolymer is the product obtained by copolymerizing 2,3,3,3-tetrafluoropropene with trifluorochloroethylene. Such polymeric materials also are useful in applications where a high temperature rubber is required.

Particularly valuable low temperature and oil and fuel resistant polymers of 2,3,3,3-tetrafluoropropene are those containing between about 2 and about 45 mol percent of 2,3,3,3-tetrafluoropropene, the remaining major constituent being a 1,1-difluorobutadiene such as 1,1,2-trifluorobutadiene and 1,1,3-trifluorobutadiene.

As indicated above, the fluorine-containing polymers of the present invention are prepared in various comonomer ratios at temperatures between about −30° C. and about 150° C. in the presence of a free radical forming initiator as the polymerization promoter. The preferred temperature is dependent upon the type of polymerization catalyst system employed as will be discussed in more detail hereinafter. The free radical-forming initiators or promoters comprise the organic peroxides, inorganic peroxy compounds, and certain azo compounds. The initiator is generally employed in an amount between about 0.001 and about 5 parts by weight per 100 parts of total monomer or monomers employed, and preferably are employed in an amount of between about 0.01 and about 1.0 part by weight. The polymerization catalyst systems may be aqueous or non-aqueous and include the aqueous suspension and aqueous emulsion systems, and the mass and solution systems, the aqueous emulsion systems being preferred. The copolymerization reaction may also be initiated or catalyzed by actinic or ultraviolet radiation or by ionic type promoters without departing from the scope of the present invention.

The aqueous catalyst systems comprise water and a peroxy compound as the promoter or initiator. Emulsifiers, activators, accelerators, buffers and bases may also be included as ingredients of the aqueous systems. The different types of aqueous emulsion systems are conveniently differentiated on the basis of the promoter which is employed to initiate the polymerization reaction.

One type of aqueous emulsion system is that in which an organic peroxide is employed as the initiator, and a second type is that in which an inorganic peroxy compound is employed as the initiator. Exemplary of the organic peroxides or oxidants which are particularly preferred as the initiators in an aqueous emulsion system are cumene hydroperoxide, diisopropyl benzene hydroperoxide, triisopropyl benzene hydroperoxide, tertiary-butyl hydroperoxide, tertiary-butyl perbenzoate and methyl cyclohexane hydroperoxide.

The inorganic peroxy compounds employed as the initiator in aqueous polymerization systems are preferably the water soluble inorganic peroxides such as the perborates, persulfates, perphosphates, percarbonates, barium peroxide, zinc peroxide and hydrogen peroxide. Particularly effective inorganic peroxy compounds are the water soluble salts of the peracids such as the sodium, potassium, calcium, barium and ammonium salts of the persulfuric and perphosphoric acids such as potassium persulfate and sodium perphosphate.

Activators which are often used in conjunction with the peroxy compound comprise sodium bisulfite, sodium metabisulfite, sodium thiosulfate, sodium hydrosulfate, p-toluene sulfinic acid, a reducing sugar such as dextrose and levulose and, in general, any water soluble reducing agent. Such activators generally are employed in an amount between about 0.2 and about 0.8 part by weight per 100 parts of total monomer or monomers employed.

Accelerators which are often employed in the aqueous polymerization systems comprise water soluble variable valence metal salts of sulfates, nitrates, phosphates and chlorides such as cuprous sulfate, ferrous sulfate and silver nitrate. Such accelerators are generally employed in an amount between about 0.01 and about 1.0 part per 100 parts of total monomer or monomers employed and preferably in an amount between about 0.05 and 0.5 part by weight. When an activator such as sodium metabisulfite, and an accelerator such as ferrous sulfate are employed, the catalyst system is referred to as a redox system. The above-mentioned organic peroxides are preferably employed in such a redox system.

The emulsifiers which are employed in the preferred aqueous emulsion polymerization systems comprise metal salts such as the potassium or sodium salt derivatives derived from aliphatic hydrocarbon carboxylic acids, the optimum chain length of the acid being between about 14 and about 20 carbon atoms, and the various salt derivatives of fluorochloroalkanoic acids and fluoroalkanoic acids having between about 6 and about 20 carbon atoms per molecule. Typical examples of the derivatives of the aliphatic hydrocarbon acids which are employed are potassium stearate, potassium oleate, and mixtures thereof.

The derivatives of fluoroalkanoic acids which are used include the metal salts of perfluoro-acids such as potassium perfluorooctanoate and the derivatives of the polyfluoroalkanoic acids disclosed in U.S. Patent No. 2,559,752 as being effective dispersing agents in polymerization reactions. The preferred fluorochlorocarboxylic acid derivatives which are used as emulsifiers are those of the perfluorochloro acids obtained upon hydrolysis of trifluorochloroethylene-sulfuryl chloride telomers in fuming sulfuric acid at a temperature between about 140° C. and about 210° C. The telomers are prepared by reacting trifluorochloroethylene and sulfuryl chloride in the presence of a promoter such as benzoyl peroxide at a temperature of about 95° C. Such perfluorochloro acids have the successively recurring unit, —$CF_2$—$CFCl$—, a chlorine-containing end group, and an even number of carbon atoms which is preferably between about 6 and about 14 carbon atoms. Typical examples of such emulsifiers are the potassium, sodium and ammonium salts of 3,5,7,8-tetrachloroundecafluorooctanoic acid and 3,5,6-trichlorooctafluorohexanoic acid. The above-mentioned emulsifiers are generally employed in a quantity between about 0.2 and about 10 parts by weight per 100 parts of total monomers and preferably between about 0.5 and 5.0 parts by weight are used.

Buffering agents may be used to maintain appropriate pH conditions during the polymerization reaction. Typical examples of suitable buffers are disodium hydrogen phosphate, and sodium metaborate. The buffers are generally employed in an amount between about 1.0 and about 4.0 parts by weight per 100 parts water, or enough to maintain the pH of the system at a value which is preferably 7 or above.

The temperature employed in aqueous systems is between about 0° C. and about 100° C. and preferably between about 15° C. and about 75° C. The lower temperatures, for example, between about 15° C. and about 35° C. are preferably employed when using a redox catalyst system, and the higher temperatures, for example, between about 35° C. and about 75° C., are preferably employed when no accelerator or activator are present.

As indicated above, the polymerization process of the present invention also may be carried out at a temperature between about −30° C. and about 150° C. in a non-aqueous mass or bulk polymerization system comprising a free radical-forming promoter such as the organic peroxides and azo compounds. The organic peroxides which may be used include the aliphatic and aromatic peroxy compounds as well as the fluorine and chlorine substituted organic peroxides. Exemplary of suitable aliphatic peroxides are diacetyl peroxide, lauroyl peroxide, tertiary-butyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoroacetyl peroxide and perfluorononanoyl peroxide. Exemplary of suitable aromatic peroxides are benzoyl peroxide, p-nitrobenzoyl peroxide and 2,4-dichlorobenzoyl peroxide. Exemplary of the azo compounds which may be employed are 2,2′-azo-bis-isobutyronitrile, 2,2′-azo-bis-2,4-dimethylvaleronitrile and 2,2′-azo-bis-2,3,3-trimethylbutyronitrile.

The preferred temperature employed to effect polymerization in a mass or bulk system is dependent upon the type catalyst employed. For example, the halogenated peroxides such as trichloroacetyl peroxide, perfluoropropionyl peroxide, and 2,4-dichlorobenzoyl peroxide and azo compounds are preferably employed at a temperature between about −30° C. and about 65° C. The ionic promoters and the non-halogenated peroxy compounds such as acetyl peroxide, benzoyl peroxide and tertiary-butyl peroxide are preferably employed at a temperature between about 30° C. and about 150° C.

The polymerization process of the present invention also may be effected in the presence of an organic solvent instead of or in addition to water. Examples of solvents of this kind are fluorochlorocarbon solvents such as fluorotrichloromethane (Freon-11) and the sulfuryl chloride telomers of trifluorochloroethylene. Such telomers contain the successively recurring unit, —$CF_2CFCl$, chlorine end groups, and an even number of carbon atoms which is preferably between 4 and 14.

The polymerization reactions described herein to produce polymeric materials comprising 2,3,3,3-tetrafluoropropene are conveniently carried out under autogenous pressure. In general these pressures do not rise above approximately 200 atmospheres. Superimposed pressures up to about 500 atmospheres or higher also may be employed and are attained by charging the polymerization zone with an inert gas such as nitrogen, to obtain the desired elevated pressure. Generally speaking, the polymerization reactions of the present invention are conducted for a reaction time which may vary between about 1 and about 100 hours, but usually good yields of polymer product are obtained in less than about 72 hours. The polymerization reaction can be carried out in a batchwise or continuous manner as desired.

Plasticizers and finely divided solids which serve as fillers can be included in the polymerization mixture and the polymerization can be carried out in their presence. Examples of suitable fillers include pigments such as titanium oxide, metals such as copper and iron powder and other finely divided materials such as mica and asbestos. These and similar materials can also be added to the preformed polymers.

The 2,3,3,3-tetrafluoropropene polymers of the present invention are particularly suitable and useful as durable, flexible coatings for application to metal or fabric surfaces. The copolymers are dissolved in a suitable solvent and applied to the surfaces by spraying, brushing, or other such conventional coating techniques. Particularly useful solvents for this purpose comprise the relatively low molecular weight and volatile aliphatic carboxylic acid esters such as methyl acetate, ethyl acetate, and butyl acetate. In this respect it should be noted that it is often desirable to reduce the molecular weight of the finished polymers of the present invention in order to obtain greater solubility in organic solvents and to obtain the increased softness in their rubbery characteristics which may sometimes be desirable. The polymerization reactions which are carried out in the presence of the polymerization promoters of the present invention normally tend to form very high molecular weight polymeric products, that is, polymers having a molecular weight of at least 50,000. A reduction of the strength of the recipe or polymerization promoter merely slows the rate of reaction without appreciably affecting the molecular weight of the finished copolymer. It has been found, however, that the addition of various polymerization modifiers appreciably reduces the molecular weight of the copolymers products and increases their solubility without affecting unduly the over-all yield. Suitable polymerization modifiers include chloroform, 1,1,2-trichlorotrifluoroethane (Freon 113), carbon tetrachloride, bromotrichloromethane, trichloroacetyl chloride and dodecyl mercaptan. These polymerization modifiers are preferably added in amounts between about 1 and about 10 parts by weight per 100 parts of total monomer or monomers charged to the polymerization zone.

The following examples are offered as a better understanding of the present invention and are not to be construed as unnecessarily limiting thereto. The monomer, 2,3,3,3-tetrafluoropropene ($CF_3$—$CF$=$CH_2$), is prepared as disclosed in the Journal of the American Chemical Society, volume 66, page 497 (March 1946).

Example 1

This example illustrates the homopolymerization of 2,3,3,3-tetrafluoropropene to produce a resinous thermoplastic material.

A heavy walled glass polymerization tube was flushed with nitrogen and was then charged with 5 ml. of a 0.75 percent by weight aqueous solution of the potassium salt of the $C_8$-telomer acid derived from the $C_8$-sulfuryl chloride telomer of trifluorochloroethylene, namely potassium 3,5,7,8-tetrachloroperfluorooctanoate, the pH of this solution having been adjusted to 12 by the addition of an aqueous potassium hydroxide solution. The potassium $C_8$-telomerate functions as an emulsifier. The stoppered tube was then placed in a liquid nitrogen freezing bath. After the contents of the tube were frozen solid, the tube was charged with 1 ml. of a 2 percent by weight aqueous solution of sodium metabisulfite, the contents were refrozen, and the tube was further charged with 4 ml. of a 1.25 percent by weight aqueous solution of potassium persulfate. In a separate experiment it was found that the final pH is about 7.0 when the aforesaid solutions, in the amounts stated, are mixed without freezing. The contents of the tube were then refrozen, and the tube was connected to a gas-transfer system and evacuated at liquid nitrogen temperature. Thereafter 2.5 grams of 2,3,3,3-tetrafluoropropene were distilled into the tube. The polymerization tube was then sealed and rotated end-over-end in a temperature regulated bath at 50° C. The polymerization was conducted under autogenous pressure at 50° C. for a period of 24 hours. The polymer latex thus obtained was coagulated by freezing at liquid nitrogen temperature. The coagulated product was collected, washed with hot water to remove residual salts, and dried to constant weight in vacuo at 35° C. A high molecular weight resinous thermoplastic material was obtained. The poly-2,3,3,3-tetrafluoropropene homopolymer of this example is useful as a protective lining for reactor vessels and tanks, the metal surfaces of which may come into contact with strong and corrosive chemicals.

Example 2

This example illustrates the copolymerization of 2,3,3,3-tetrafluoropropene with vinylidene fluoride.

Employing the procedure set forth in Example 1 and the same aqueous emulsion polymerization system, the tube was charged with 3.2 grams of 2,3,3,3-tetrafluoropropene and 1.8 grams of vinylidene fluoride to make up a total monomer charge containing 50 mol percent of each monomer. The polymerization reaction was carried out under autogenous conditions of pressure at a temperature of 25° C. for a period of 71 hours. The resultant polymer latex was worked up in accordance with the same procedure set forth in Example 1. A white, slightly rubbery product was obtained and, upon analysis for fluorine content, was found to comprise approximately 20 mol percent of combined 2,3,3,3-tetrafluoropropene, the remaining major constituent being vinylidene fluoride, that is, about 80 mol percent. The copolymer was obtained in an amount corresponding to a 41 percent conversion.

When this 2,3,3,3-tetrafluoropropene: vinylidene fluoride copolymer product was heated to 50° C., the copolymer became a very rubbery material having good physical and mechanical properties. It is particularly useful as a high temperature, acid resistant rubber suitable as a protective coating or lining, as a wire insulator, and in the manufacture of flexible films, sheets of varying thickness, gaskets and other such end products. The copolymer is also relatively resistant to diester type hydraulic fluids such as Esso Turbo Oil 15, thereby making it useful in aircraft component parts.

Example 3

This example illustrates the copolymerization of 2,3,3,3-tetrafluoropropene with trifluoroethylene.

Employing the procedure set forth in Example 1 and the same aqueous emulsion polymerization system, the tube was charged with 2.8 grams of 2,3,3,3-tetrafluoropropene and 2.2 grams of trifluoroethylene to make up a total monomer charge containing 50 mol percent of each monomer. The polymerization reaction was carried out under autogenous conditions of pressure at a temperature of 25° C. for 71 hours. The resultant polymer latex was worked up in accordance with the same procedure set forth in Example 1. A white, slightly rubbery product was obtained and, upon analysis for fluorine content, was found to comprise approximately 7 mol percent of combined 2,3,3,3-tetrafluoropropene, the remaining major constituent being trifluoroethylene, i.e. trifluoroethylene was present in an amount of about 93 mol percent. The copolymer was obtained in an amount corresponding to about a 12 percent conversion.

When this 2,3,3,3-tetrafluoropropene: trifluoroethylene copolymer product was heated to 50° C., the copolymer became a very rubbery material having good physical and mechanical properties which are retained at temperatures as high as 300° C. This copolymer is a valuable high temperature rubber suitable for use in the manufacture of resilient gaskets, valve diaphragms, brake linings, and as protective linings for reaction vessels.

Example 4

This example illustrates the copolymerization of 2,3,3,3-tetrafluoropropene with trifluorochloroethylene.

Employing the procedure set forth in Example 1 and the same aqueous emulsion polymerization system, the tube was charged with 2.4 grams of 2,3,3,3-tetrafluoropropene and 2.6 grams of trifluorochloroethylene to make up a total monomer charge containing 50 mol percent of each monomer. The polymerization reaction was carried out under autogenous conditions of pressure at a temperature of 50° C. for 96 hours. The resultant polymer latex was worked up in accordance with the same procedure set forth in Example 1. A resinous thermoplastic product was obtained and, upon analysis for fluorine content, was found to comprise approximately 70 mol percent of combined 2,3,3,3-tetrafluoropropene, the remaining major constituent being trifluorochloroethylene. The copolymer was obtained in an amount corresponding to about a 46 percent conversion.

When this 2,3,3,3-tetrafluoropropene: trifluorochloroethylene copolymer was heated to 50° C., the copolymer became a soft and rubbery material having good physical, mechanical and high temperature properties. It is particularly useful as a protective coating on metal surfaces which are to be exposed to strong chemicals such as nitric acid. It can be fabricated into a wide variety of articles by conventional extrusion and compression molding techniques.

Example 5

This example illustrates the copolymerization of 2,3,3,3-tetrafluoropropene with 1,1-difluoro-2-methyl-butadiene.

Employing the procedure set forth in Example 1 and the same aqueous emulsion polymerization system, the tube was charged with 2.7 grams of 2,3,3,3-tetrafluoropropene and 2.3 grams of 1,1-difluoro-2-methyl-butadiene to make up a total monomer charge containing 50 mol percent of each monomer. The polymerization reaction was carried out under autogenous conditions of pressure at a temperature of 50° C. for 24 hours. The resultant polymer latex was worked up in accordance with the same procedure set forth in Example 1. A rubbery product was obtained and, upon analysis for fluorine content, was found to comprise approximately 8.5 mol percent of combined 2,3,3,3-tetrafluoropropene, the remaining major constituent being 1,1-difluoro-2-methylbutadiene. The copolymer was obtained in an amount corresponding to about a 14 percent conversion.

The 2,3,3,3-tetrafluoropropene: 1,1-difluoro-2-methylbutadiene copolymer of this example is particularly useful as a protective coating on surfaces which are to be exposed to relatively low temperatures and/or to strong acids and hydrocarbon type fuels.

Example 6

This example illustrates the copolymerization of 2,3,3,3-tetrafluoropropene with 1,1-chlorofluoroethylene.

Employing the procedure set forth in Example 1 and the same aqueous emulsion polymerization system, the tube was charged with 2.9 grams of 2,3,3,3-tetrafluoropropene and 2.1 grams of 1,1-chlorofluoroethylene to make up a total monomer charge containing 50 mol percent of each monomer. The polymerization reaction was carried out under autogenous conditions of pressure at a temperature of 50° C. for 21 hours. The resultant polymer latex was worked up in accordance with the same procedure set forth in Example 1. A white, slightly rubbery product was obtained and, upon analysis for fluorine content, was found to comprise approximately 43.5 mol percent of combined 2,3,3,3-tetrafluoropropene, the remaining major constituent being 1,1-chlorofluoroethylene. The copolymer was obtained in an amount corresponding to about a 91 percent conversion.

When this 2,3,3,3-tetrafluoropropene: 1,1-chlorofluoroethylene copolymer product was heated to 50° C., the copolymer became a very rubbery material having good physical and mechanical properties. It is particularly useful as a high temperature, acid resistant rubber suitable as a protective coating or lining, and in the manufacture of flexible films, sheets of varying thickness, gaskets and other such end products.

Example 7

This example illustrates the copolymerization of 2,3,3,3-tetrafluoropropene with 1,1,2-trifluorobutadiene.

A heavy walled glass polymerization tube was flushed with nitrogen and was then charged with 1 ml. of a 2 percent by weight aqueous solution of sodium metabisulfite. The stoppered tube was then placed in a liquid nitrogen freezing bath. After the contents of the tube were frozen solid, the tube was charged with 5 ml. of a 5 percent by weight aqueous solution of potassium stearate, having a pH adjusted to about 11 by the addition of an aqueous solution of potassium hydroxide. The contents of the tube were refrozen and the tube was then charged with 4 ml. of a 2.5 percent by weight aqueous solution of potassium persulfate. The contents of the tube were again frozen and the tube was then connected to a gas-transfer system and evacuated at liquid nitrogen temperature. Thereafter 2.7 grams of 2,3,3,3-tetrafluoropropene and 2.3 grams of 1,1,2-trifluorobutadiene were distilled into the tube. The polymerization tube was then sealed and rotated end-over-end in a temperature regulated bath at 50° C. The polymerization was conducted under autogenous pressure at 50° C. for a period of 24 hours. The polymer latex thereby obtained was coagulated by freezing at liquid nitrogen temperature. The coagulated product was collected, washed with hot water to remove residual salts and dried to constant weight in vacuo at 35° C. A rubbery material was obtained and, upon analysis for fluorine content, was found to comprise approximately 2.5 mol percent of combined 2,3,3,3-tetrafluoropropene, the remaining major constituent being 1,1,2-trifluorobutadiene. The copolymer was obtained in an amount corresponding to a 44 percent conversion.

A sample of the raw copolymer was compression molded at 250° F. for 5 minutes. After molding the sample remained as a tough rubber. A volume increase of only 18 percent was observed in the molded sample when tested according to ASTM Designation D-471-49T, in ASTM Type II Fuel, which consists of isooctane (60 percent by volume), benzene (5 percent by volume), toluene (20 percent by volume) and xylene (15 percent by volume). Gehman stiffness of the molded sample of the raw copolymer, determined according to ASTM Designation D-1053-49-T, is as follows: where the T values represent the temperature at which the polymer is two, five, ten and one hundred times as stiff as it is at 25° C.

$T_2 = -11.5°$ C.; $T_5 = -24.5°$ C.;
$T_{10} = -29.4°$ C.; $T_{100} = -78.5°$ C.

The outstanding resistance of the 2,3,3,3-tetrafluoropropene: 1,1,2-trifluorobutadiene copolymer of this example to aliphatic and aromatic oils and fuels makes it particularly useful for the fabrication of O-rings, valve diaphragms, pumps, seals and the like which are to be used in engine component parts. It is also particularly suitable for the manufacture of end products which are to be used at relatively low temperatures without embrittlement.

Example 8

This example illustrates the copolymerization of 2,3,3,3-tetrafluoropropene with 1,1,3-trifluorobutadiene.

Employing the procedure set forth in Example 7 and the same aqueous emulsion polymerization system, the tube was charged with 2.6 grams of 2,3,3,3-tetrafluoropropene and 2.4 grams of 1,1,3-trifluorobutadiene to make up a total monomer charge containing 50 mol percent of each monomer. The polymerization reaction was carried out under autogenous conditions of pressure at a temperature of 50° C. for a period of 22 hours. The resultant polymer was worked up in accordance with the same procedure set forth in Example 7. A tough, snappy rubber was obtained and, upon analysis for fluorine content, was found to comprise approximately 29 mol percent of combined 2,3,3,3-tetrafluoropropene, the remaining major constituent being 1,1,3-trifluorobutadiene, i.e. about 71 mol percent of combined 1,1,3-trifluorobutadiene. The copolymer was obtained in an amount corresponding to a 34 percent conversion.

A sample of the raw copolymer was compression molded at 250° F. for 5 minutes. After molding, the sample remained a tough, snappy rubber having an excellent torsional modulus of 69. The raw copolymer milled easily at 25° C. in a conventional rubber mill and remained as a snappy rubber.

The 2,3,3,3 - tetrafluoropropene: 1,1,3 - trifluorobutadiene copolymers are useful as protective coatings on surfaces which are to be exposed to aromatic and aliphatic type fuels such as ASTM Type 2 Fuel, and to relatively low temperatures during the course of performing their function.

Example 9

This example illustrates the polymerization reaction between 2,3,3,3-tetrafluoropropene and acrylonitrile.

Employing the procedure set forth in Example 1 above and the same aqueous emulsion polymerization system, the tube was charged with 3.4 grams of 2,3,3,3-tetrafluoropropene and 1.6 grams of acrylonitrile to make up a total monomer charge containing 50 mol percent of each monomer. The polymerization reaction was carried out under autogenous conditions of pressure at a temperature of 50° C. for 21 hours. The resultant polymer latex was worked up in accordance with the same procedure set forth in Example 1. A powdery product was obtained in a 69 percent conversion. Upon analysis, the product was found to consist essentially of combined acrylonitrile, that is, more than 99 mol percent of the product was polyacrylonitrile, essentially no copolymerization between 2,3,3,3-tetrafluoropropene and acrylonitrile having occurred.

It has been found that the presence of a carbon atom bearing at least two halogen substituents such as fluorine and/or chorine in the comonomer appears to be essential to obtaining stable copolymers of 2,3,3,3-tetrafluoropropene having improved low and high temperature properties. For example, when a monomer charge containing 50 mol percent of 2,3,3,3-tetrafluoropropene and 2-fluorobutadiene was reacted under the same conditions set forth in Example 7 above, an unstable short rubber was obtained which upon analysis for fluorine content was found to lose fluorine upon standing at room temperature. In contrast, the copolymers of 2,3,3,3-tetrafluoropropene of the present invention were found to be stable products, and do not lose fluorine upon standing at room or elevated temperatures.

Generally speaking, the polymers comprising 2,3,3,3-tetrafluoropropene produced in accordance with the present invention, may be extrusion, compression and transfer molded at temperatures between about 75° F. and about 450° F. into a wide variety of useful end products such as O-rings, washers, gaskets, valve diaphragms, pumps, seals and films or sheets of varying thickness. When applied as protective coatings to metal or fabric surfaces, the raw polymers of this invention are dissolved in a suitable solvent such as ethyl acetate and applied by such methods as spraying, dipping or brushing, as desired. The coatings thus obtained have good resinous or elastomeric properties depending upon the composition of the particular polymer used for this purpose, hardness and high heat resistance. As a result of their excellent resistance to oils, fuels and strong acids, the polymers of this invention are used in a preferred form as protective linings for reactor tanks and aircraft components. Their good low temperature characteristics further make them suitable for use as linings and gaskets in refrigeration systems. Their excellent high temperature properties make the 2,3,3,3-tetrafluoropropene copolymers of the present invention particularly valuable as electrical wire insulators and brake linings.

As is apparent, the present invention relates to novel compositions comprising 2,3,3,3-tetrafluoropropene including both the homopolymer, and copolymers of this fluoropropene with an olefin, the carbon atoms of which are bonded only to hydrogen and/or halogen atoms, and having at least two of its halogen substituents on a terminal carbon atom, and to a method of preparation of such polymers. The comonomers contain either a

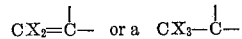

terminal group wherein X is an atom of halogen and is preferably a normally gaseous halogen atom. Various alterations and modifications of the novel halogen-containing polymers of the present invention and of the polymerization system and reaction conditions employed to produce such compositions may become apparent to those skilled in the art without departing from the scope of this invention.

I claim:

1. A normally solid copolymer of between about 2 and about 15 mol percent 2,3,3,3-tetrafluoropropene and correspondingly between about 98 and about 85 mol percent of a fluorinated ethylene selected from the group consisting of vinylidene fluoride, trifluoroethylene, trifluorochloroethylene and tetrafluoroethylene.

2. A copolymer of between about 2 and about 15 mol percent 2,3,3,3-tetrafluoropropene and correspondingly between about 98 and about 85 mol percent of vinylidene fluoride.

3. A copolymer of between about 2 and about 15 mol percent 2,3,3,3-tetrafluoropropene and correspondingly between about 9 8and about 85 mol percent of trifluoroethylene.

4. A copolymer of between about 2 and about 15 mol percent 2,3,3,3-tetrafluoropropene and correspondingly between about 98 and about 85 mol percent of trifluorochloroethylene.

5. A copolymer of between about 2 and about 15 mol percent 2,3,3,3-tetrafluoropropene and correspondingly between about 98 and about 85 mol percent of tetrafluoroethylene.

References Cited in the file of this patent
UNITED STATES PATENTS

| | | |
|---|---|---|
| 2,484,530 | Schroeder | Oct. 11, 1949 |
| 2,549,580 | Denison et al. | Apr. 17, 1951 |
| 2,626,252 | Tawney | Jan. 20, 1953 |
| 2,919,263 | Kahrs et al. | Dec. 29, 1959 |